United States Patent

[11] 3,573,435

[72] Inventors Peter Heinz
Im Oschle;
Gerhard Podschadly, Uberlingen
(Bodensee), Germany

[21] Appl. No. 824,488
[22] Filed May 14, 1969
[45] Patented Apr. 6, 1971
[73] Assignee Bodenseewerk Perkin-Elmer & Co. G.m.b.H.
Uberlingen (Bodensee), Germany
[32] Priority May 18, 1968
[33] Germany
[31] P 17 74 298.2

[54] READOUT FOR MOVING DIGITALLY PUNCHED CARDS
6 Claims, 3 Drawing Figs.

[52] U.S. Cl. ........ 235/61.11, 200/46
[51] Int. Cl. ........ G06k 7/015, G06k 13/06
[50] Field of Search ........ 235/61.113, 61.1, 61.112, 61.117, 61.11, 61.115; 200/46, (Inquired); 270/(Inquired); 271/(Inquired)

[56] References Cited
UNITED STATES PATENTS 1,509,513 9/1924 Liedstrand ........ 235/61.11
3,157,777 11/1964 Rabinow ........ 235/61.11
3,239,808 3/1966 Elliott et al. ........ 235/61.11
3,325,631 6/1967 Onuma et al. ........ 235/61.11

*Primary Examiner*—Thomas A. Robinson
*Attorney*—Edward R. Hyde, Jr.

ABSTRACT: A device for reading digitally stored data on, for example, a moving punched card (for example, by being carried along by a rotating turntable, which may be part of an automatic chemical analysis instrument). A reading or scanning device, including a series of pins for finding each of the holes in the punched card, is mounted for both movement toward and away from the card (so as to initiate and terminate reading of the card) and movement generally parallel to the card movement direction. The latter movement is controlled by coupling (as by a lever system and pin connection) to movement of the turntable, supporting the punched card; and additional positive locating means (such as pinlike guide bars) directly couple the scanning device to the punched card support during the reading operation. Each of the individual pins that "finds" a hole closes one of a group of electrical contacts, each of which is supplied an appropriate number of pulses (equal to the digital "value" of that particular hole location) by a pulse generator (which may comprise a "light gate" and a digital interrupting means, such as a series of holes in a revolving drum). Thus, the device scans a moving record medium, such as a card with punched holes, without any risk of substantial misalignment of the scanning device (i.e., the pins) relative to the moving card.

INVENTORS.
Peter Heinz
Gerhard Podschadly

BY Daniel R. Levinson

ATTORNEY.

READOUT FOR MOVING DIGITALLY PUNCHED CARDS

The present invention relates to a device for the readout of digitally stored data from sheetlike record media moving along with a mounting support, by "reading" predetermined spots of the media surface by means of a scanning device arranged on a reciprocating carriage.

With a prior device of the type indicated the record media may be a punched card, the information is stored by holes in this punched card, provided in different rows at predetermined spots on the punched card. By way of example, each row corresponds to one digit of a decimal figure. The number of holes in such a row may then, for instance, correspond to the value of this digit. With one prior arrangement (see, for example, Applicants' prior copending application Ser. No. 738,191 filed Jun. 19, 1968) each row has associated therewith an outwardly resilient arm carrying a toothed wheel at its end. A carriage (supporting all the resilient arms) is moved past the punched card, so that each of the resilient arms scans one row. If there are holes present in the row, the toothed wheel engages into the respective holes with its teeth, and the arm springs outwardly, whereby a contact will be closed each time. Movement of the carriage makes connection with a pulse generator, supplying pulses via these contacts to one counter each. Pulses will be supplied as long as the arm is pivoted outwardly during the movement of the carriage, thus, each time the toothed wheel engages each hole in the punched card. Therefore, the number of pulses corresponds to the number of holes in the punched card.

These and similar systems operate on the assumption that the punched card is fixed in an accurately defined position relative to the carriage. In many applications this prerequisite cannot be met. By way of example, the record media (punched cards) may be arranged at the periphery of a turntable moving continuously or, if required, at varying speed. This may be, for example, the turntable of an automatic analytical apparatus, wherein each punched card supplies respective information on type and origin of each sample. In such applications the prior arrangements are impractical. Moreover, with the described prior arrangement up to nine holes must be provided for each decimal digit.

Accordingly, it is an object of the present invention to provide a device for the readout of date from a moving sheetlike record media, which operates independently of the manner of movement of the record media.

It is a further object of the invention to provide a readout device of the type indicated which permits the readout of data stored in a binary or otherwise encoded decimal code, so that only four spots of the media surface need be scanned for each (decimal) digit.

The device according to the invention is characterized in that the carriage (supporting the "reading" or scanning device) is carried along mechanically by a tang moved with the support, mounting the record media, along a path corresponding approximately to the width of the record media, and that the scanning device is movable towards the record media by a servomotor and means are included for mechanical centering thereat with respect to the record media.

Thus, in an apparatus according to the invention, the scanning device is not moved across the record media as is the case with the described prior arrangement. At the moment of scanning, the scanning device and the record media are rather in a position of rest relatively to each other. This is attained independently of whether the record media moves uniformly or nonuniformly. Thus, it is, for instances, not necessary to stop a turntable ultimately supporting the record media during the scan.

The record media may be punched cards wherein the data to be read are stored in form of holes arranged in rows at predetermined spots. Then, the scanning device may comprise resilient pins at the predetermined location, so that contacts are actuated thereby; and a pulse generator may be provided which during scanning of each row, successively supplies predetermined (different) pulse sequences to each of the different contacts, which are associated therewith. The number of pulses of each of these pulse sequences depends on the "-weight" or value (e.g., 1, 2, 4, 8 in binary code), which a hole at the respective location or spot of the record media has in the code used.

Of course, instead of having holes the record media could, for instance, instead be provided with dark and bright (i.e., light) fields at the respective spots, which are scanned by photoelectric means. Further, electric (e.g., electrostatic charges) or magnetic marking and scanning could also be utilized instead.

A single illustrative embodiment of the present invention is described hereinafter with reference to the accompanying drawings, in which.

Figure 1:
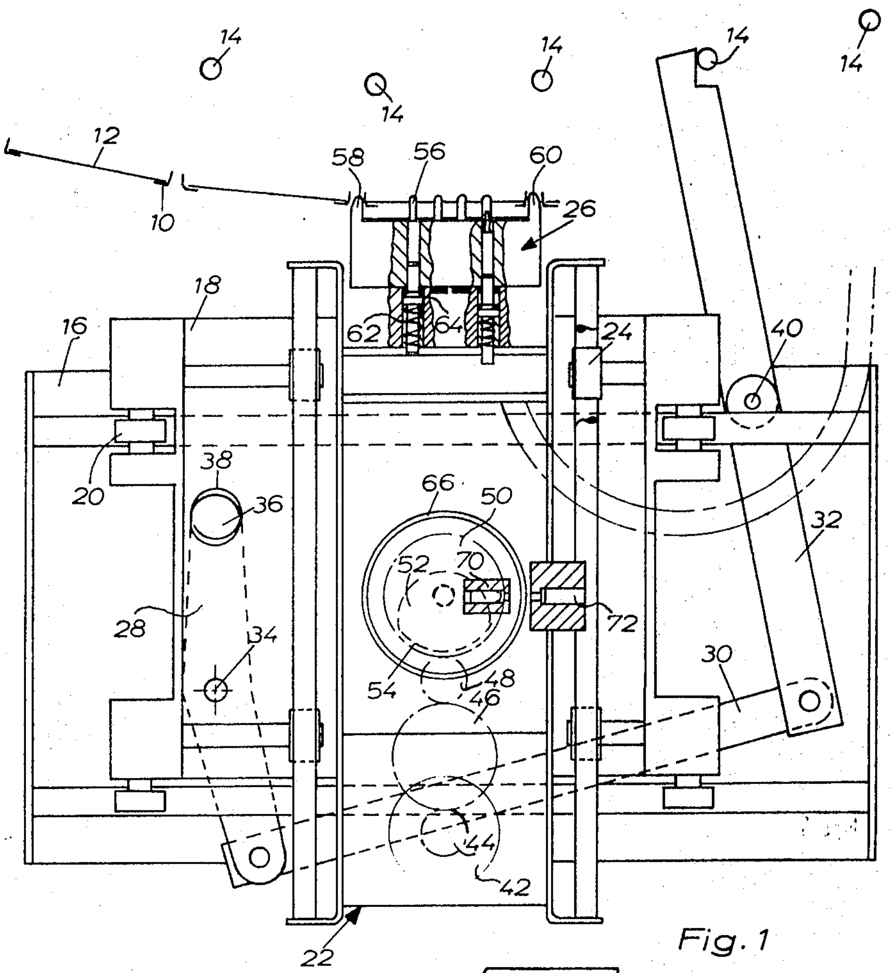
FIG. 1 is a plan view of a readout device in accordance with the present invention.

At the periphery of a rotatable turntable, not shown in any detail, comprising a major component, for instance, of an automatically operating chemical analytical apparatus, there are provided mounting supports 10 for record media 12 in form of punched cards. At angular distances corresponding to the width of the record media 12, but at a smaller radial distance form the axis of rotation of the turntable (which axis is above the upper margin of the drawing), pins or tangs 14 are mounted on the turntable. Adjacent the turntable there is provided a stationary guide 16 on which a first carriage 18 travels by means of guide rollers 20. A second carriage, generally referenced 22, is guided between rollers 24 which have their axles on the first carriage 18. The carriage 22 is thus movable perpendicularly to the direction of movement of carriage 18. At the end of carriage 22 adjacent the turntable, it carries a scanning or "reading" device 26, which will be described hereinafter in greater detail.

The carriage 18 is movable by means of a lever system comprising a first two-armed (one-piece) lever 28, a crank or knuckle arm 30 and a second two-armed (i.e., center-pivoted) lever 32. The first two-armed lever 28 is pivoted as at 34. A pin 36 rigidly attached to one end of lever 28 engages in an oblong hole 38 in the carriage 18, the long dimension of oblong hole 38 extending perpendicularly to the direction of movement of this carriage 18. At its other end, the first lever 28 is connected with the knuckle arm 30 (by a pin and round hole connection). The knuckle arm 30 is also articulated at one end of the lever 32, which is pivoted at its center as at 40. The free end of the lever 32 projects into the path of the pins or tangs 14. The lever 32 is carried along by each tang 14 (which moves generally toward the left in FIG. 1 above the axis of the turntable, not shown) thus pivoted in a counterclockwise direction, as seen in FIG. 1. By means of the knuckle or crank arm 30 the first two-armed lever 28 is also simultaneously pivoted in a counterclockwise direction about its central pivot 34.

Pin 36 rigidly carried by arm 28 thus moves the carriage 18 towards the left in FIG. 1. The transmission (or leverage) ratio of the lever system formed by the levers 28 and 32 and the knuckle arm 30 is selected to be equal to the ratio of the linear speeds of the record media (12) and tang (14). In this manner, the carriage 18 is moved at the same linear speed as the scanned record media 12 is moving, even though the linear speed of the radially inwardly arranged tang 14 is smaller.

While the carriage 18 is thus being moved at the speed of the record media 12 (irrespectively of whether this speed is constant or nonuniform), a microswitch (not illustrated) switches on a motor 42, which is mounted on the second carriage 22. Via gears 44, 46, 48 and 50, the motor 42 drives cam 52. Cam 52 is supported on the carriage 18 in such a manner that the second carriage is moved upwardly as seen in FIG. 1, and the scanning head 26 is caused to approach the record media 12. As can be seen from FIG. 1, the cam 52 has a section 54 which is curved circularly about (i.e., has a equidistant periphery relative to) the axis of rotation of the cam. In this angular range of the cam, the carriage 22 has been moved forwardly towards the record media, and the carriage 22 remains stationary in this advanced position for a certain period of time.

The scanning head 26 has rows of pins 56 corresponding to the predetermined locations or "spots" on the punched card 12 at which the holes may be present for representation of the data. Guide bars 58, 60 are provided on both sides of the pins as centering means, whereby the scanning head 26 is centered relative to the mounting supports 10 of the punched card when in its advanced (i.e., card-engaging) position.

In this manner, absolutely synchronous movement is ensured between the carriage 18 and the record media 12, (the punched card). At the predetermined spots or locations where there are (or may be) holes in the punched card, the respective pin 56 engages into those holes actually present, under the influence of individual springs 62. At the same time an electrical contact 64 is closed for each such hole-engaging pin 56.

Figure 2:
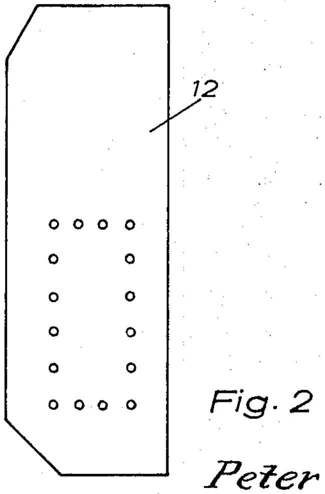
FIG. 2 shows a punched card used as the record media in the described arrangement.

As can best be seen from FIG. 2, the holes on the punched card are arranged in 6 (horizontal) rows or lines and 4 (vertical) columns. Each line corresponds to a complete (decimal) digit. Each column of the punched card 12 has a specific value or "weight." By way of example, the first column may have the "weight" 1, the second column the "weight" 2, and the third and fourth columns each the "weight" 3. If then, as is illustrated in FIG. 2, the second (horizontal row) has holes present in the first and fourth columns, this will correspond to a digit value of: 1 +3, and therefore 4. If holes are provided as in the first (horizontal) row in all four (vertical) columns, then the total digit value will be 1 +2 +3 +3, and thus 9. The scanning head 26 has seven horizontal rows of four pins each, each of which has associated contacts 64. Six of these rows are used to scan the holes in the punched card 12. The seventh row of pins 56 is used for monitoring whether the punched card is actually properly positioned in its mounting support. Otherwise, a false readout might occur due to the fact that the punched card 12 might be shifted in its mounting support 10 so that the holes are displaced by substantially exactly one row.

Figure 3:
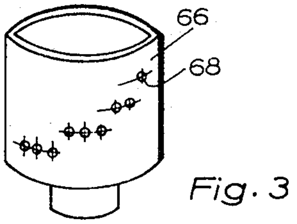
FIG. 3 is a perspective illustration of the drum acting as pulse generator and provided with photoelectrically scanned holes, which may be used in the embodiment according to FIG. 1.

The cam 52 has rotatingly connected therewith a drum 66 as is shown in perspective view in FIG. 3. In the angular range 54 where the cam 52 has a circular periphery, the drum 66 is formed with a series of peripherally and axially offset holes 68. By a series of small light "barriers" (i.e., interruptable light paths), each comprising one light source 70 and one mating photoelectric detector 72 arranged in aligned relationship, each individual hole series 68 (i.e., each horizontal plane of holes as seen in FIG. 3) are scanned. Upon rotation of the cam 52 and, conjointly therewith, of the drum 66, first the uppermost light barrier 70, 72 supplies a single pulse, then the next lower light barrier supplies two pulses, and subsequently, the third light barrier supplies three pulses. Finally, the fourth light barrier again supplies three pulses. These number of pulses are of course caused by the pattern of the holes 68 in drum 66, as easily seen in FIG. 3.

Each of the pulse sequences generated by each of the (four) light "barriers" (70,72) are supplied to each of the corresponding contacts 64 in one (vertical) column, operated by the pins 56 in such (vertical) column. In particular, each of contacts 64 operated by the pins 56 in the first (i.e., left in FIG. 1 and 2) column will be supplied by a single pulse by the first (uppermost in FIG. 3) single hole 68 in drum 66, causing a single pulse to be generated by its light "barrier" (i.e., light beam source 70 and photodetector 72). Similarly, each contact 64 operated by a pin in the second (from the left in both FIGS. 1 and 2) vertical column is supplied with two pulses because of the two holes 68 in the second highest (in FIG. 3) row in drum 66 and the resulting two pulses generated by their associated light barrier (70,72); each third-from-the-left vertical column of contacts 64 (FIG. 1) will be supplied by the (three) pulses generated by the (third from top, or next to bottom in FIG. 3) array of (three) holes 68 in drum 66 and its associated light "barrier" (70, 72); and, finally, each contact 64 in the right-hand column FIGS. 1 and 2) is supplied three pulses also, because of the action of the holes 68 in the lowermost array (in FIG. 3) in drum 66, and their associated pulse-generating light "barrier" or gate (70, 72). Any number of pulses from 1 through 9 (or 0 ) may therefore be caused to appear at the combined outputs for each horizontal (in FIG. 2) row of four contacts 64. In particular, we may write the total ($T$) of the pulses for each such horizontal array as: $T = p1 + q2 + r3 + s3$, where each of $p$, $q$, $r$ and $s$ have the two possible values of 0 (no hole) or 1 (hole present) depending on whether the four contacts are open or closed by its actuating pin 56. Thus if no hole is present at all ($p$, $q$, $r$ and $s$ all are 0), $T = 0$; if a hole is present only at the first (left in FIG. 2) column, $T = 1$ ($p = 1$; $q, r, s = 0$); if a hole is present only in the second (from left in FIG. 2) column, $T = 2$ ($q = 1$, $p, r, s = 0$); etc. To generate such values as $T = 6$, more than one possibility exists (i.e., $p$, $q$ and $r = 1$, $s = 0$; $p$, $q$ and $s = 1$, $r = 0$; or $r$ and $s = 1$, $p$ and $q = 0$); but of course this does not adversely affect the ability either of the record 12 to carry the number 6 (in any one of these forms) or for the "scanning" device 26 to read correctly the value, 6, (regardless of the particular way it is represented by the particular holes utilized). Each series of pulses (i.e., the total number, $T$) which successively appear over those of the (four) contacts 64 which are closed in each horizontal row (as seen in FIG. 2) are supplied to a counter and a printing device, so as to supply in any desired form a permanent representation of the value (from 0 through 9 ) of each four-location horizontal row on the record medium 12.

After completion of the scanning operation the carriage 22 is returned a position out of contact with record medium 12 (i.e., "downwardly" in the plane of FIG. 1). The lever 32 is thus withdrawn from the tang 14, and the carriage 18 returns to the right (in FIG. 1) under the influence of a spring (not shown). Now, the next following tang 14 engages the end of lever 32, and the described cycle is repeated, for scanning or "reading" of the next following record media 12.

We claim:

1. In a device for reading out digitally stored data from generally flat record media, which record media are mounted on a moving support (10), of the type in which a scanning device (26) reads predetermined locations on a surface of each of the media, the improvement comprising:

said scanning device (26) being supported by a first reciprocating carriage (18);

at least one first moving means (14) rigidly supported by and moving with said media support (10);

connecting means (28—32, 34—40) operatively connected to said first carriage and disposed to be engaged by said first moving means for operatively moving said first carriage along a path generally parallel to the record media movement direction, and for a distance substantially equal to the width of one of said record media;

a second movable carriage (22) for movably supporting said scanning device (26) so as to allow movement thereof in a second direction generally toward and away from said record media;

a second motive means (42) for moving said second carriage, such movement being initiated during movement of said first carriage, so as to cause said scanning device (26) to move toward said record media into reading relationship therewith; and centering means (58, 60) rigidly attached to said scanning device for assuring lateral mechanical centering thereof with respect to said record medium, during said reading by said scanning device.

2. A device according to claim 1, in which:

said support (10) for said record media comprises individual support means rigidly mounted on the periphery of a rotatable turntable;

said first moving means (14) comprises a series of tangs rigidly attached to said turntable at regular angular spacing from each other corresponding to central angle at the axis of said turntable of the lateral width of said record media, but at a first radial distance from the axis of rotation of said turntable different from the second radial distance of said record media from said axis;

said connecting means comprises a lever system, having a lever ratio equal to the ratio of said second radial distance to said first radial distance; and whereby the linear speed of said tangs is multiplied by said lever ratio, so as to cause said scanning means to be moved at the same linear speed as said record media during said reading.

3. A device according to claim 2, in which said connecting lever system comprises:

a first pivoted lever (28), operatively connected to said first carriage (18);

a second pivoted lever (32), one end of which projects into the path of and is therefore operatively engaged by said tangs (14); and a second part of said second lever (32) being operatively connected to said first lever (28), in such manner that said first lever moves said first carriage at a linear rate equal to the linear speed of said tangs multiplied by said lever ratio of the entire lever system.

4. A device according to claim 1, in which:

said record media comprise punched cards (12), in which the stored data are in the form of holes at predetermined locations and arranged in horizontal rows;

said scanning device (26) comprises a plurality of resiliently mounted pins (56) at specific locations corresponding to said predetermined locations at which holes may be present in said punched cards;

electrical contact means (64) operatively connected to each of said pins;

pulse generator means (66—72) for generating various predetermined pulse sequences;

means for supplying different ones of said various pulse sequences to each of said electrical contact means; and whereby engagement of any particular ones of said various pins (56) with particular holes in said punched cards will cause specific sequences of pulses to be supplied over those electrical contact means connected to said particular ones of said pins.

5. A device according to claim 4, in which:

said second motive means for moving said second carriage comprises an electric motor (42), the driving shaft of which is directly connected to a cam (52);

said cam operatively engages said carriage and has on part of its operative periphery a circularly curved portion (54) concentric with its axis of rotation, so as to cause dwell as said second carriage when it is in its reading position;

a generally cylindrical drum (66) rigidly attached relative to said cam, so as to rotate conjointly therewith;

the cylindrical surface of said drum comprising a series of peripherally arranged holes (68), each member of said series being offset relative to each other along the cylindrical axis of said drum;

a corresponding series of light gates (70,72), each comprising a radiation source and a photosensitive detector, each being axially aligned with each series of said holes; and whereby each of said light gates generated a particular pulse sequence, the number of pulses of which are equal to the number of corresponding holes in said drum.

6. A device according to claim 4, in which:

said centering means comprise guide bars (58, 60) generally straddling said pins (56), and being so positioned as to engage said record media support when said scanning device is in its reading position; and whereby said centering guide bars assure lateral alignment of said scanning device relative to each of said record media during the reading thereof by said scanning device.